United States Patent Office 2,893,826
Patented July 7, 1959

2,893,826

PLATINUM HEXAFLUORIDE AND METHOD OF FLUORINATING PLUTONIUM CONTAINING MIXTURES THEREWITH

John G. Malm, Naperville, Bernard Weinstock, Western Springs, and Howard H. Claassen, Wheaton, Ill., assignors to the United States of America as represented by the United States Atomic Energy Commission No Drawing. Application September 17, 1957
Serial No. 684,622

6 Claims. (Cl. 23—14.5)

This invention deals with a new fluoride, a method of preparing it and its use as a fluorinating agent. This invention also deals with a novel process of producing plutonium hexafluoride and a process of separating plutonium from fission products.

It is an object of this invention to provide a process for separating plutonium from other materials, for instance, from fission products a great part of which can be carried out at room temperature.

Platinum hexafluoride is made by reacting platinum metal with fluorine at a temperature of 900–1100° C. and condensing the platinum hexafluoride as it is formed on a cold surface which is at a temperature of about —196° C. to avoid decomposition. It was also found that this platinum hexafluoride has certain characteristics which make it a useful material; in particular was it discovered that the platinum hexafluoride is an excellent fluorinating agent and that a great number of substances can be fluorinated with it at room temperature, which is about 25° C. For instance, platinum hexafluoride can be used for the fluorination of metallic plutonium or of a lower plutonium fluoride, such as $PuF_3$ and $PuF_4$; the comparatively volatile plutonium hexafluoride (boiling point about 65° C.) is formed thereby. This represents a considerable advantage over a process previously used for the preparation of plutonium hexafluoride in which fluorine was used as the fluorinating agent and which required a temperature of about 700° C. At this temperature the plutonium hexafluoride is not stable after it has been separated from fluorine.

One embodiment of this invention thus comprises the preparation of plutonium hexafluoride by first fluorinating platinum at from 900 to 1100° C. with fluorine whereby platinum hexafluoride is formed and then reacting the platinum fluoride with metallic plutonium or a lower plutonium fluoride, preferably with $PuF_4$, at room temperature whereby plutonium hexafluoride is formed. Other substances can also be fluorinated with the $PtF_6$ according to the process of this invention; for instance, neptunium metal and also lower neptunium fluorides have been converted to the hexafluoride.

Another embodiment of this invention comprises the separation of plutonium from fission products. In one process frequently used the uranium of a neutron-irradiated uranium mass is separated from the fission products and the plutonium contained therein by the fluorination of the irradiated mass with liquid bromine trifluoride whereby the uranium is distilled away as the hexafluoride from a residue containing fission product fluorides and plutonium tetrafluoride. The plutonium tetrafluoride can be separated from the fission product fluorides, according to this invention, by reacting the residue with platinum hexafluoride prepared as described above whereby plutonium hexafluoride is formed which is more volatile than the fission product fluorides and therefore can be isolated by distillation.

Other embodiments of the invention comprise the process of making the platinum hexafluoride per se and the new compound platinum hexafluoride.

In the following an example is given to illustrate, but not to limit, the invention.

Example

A cylindrical brass container having a 3-inch high and 4-inch wide reactor section and an upper neck portion about 2 inches wide and 4 inches high was used. The end of the neck was provided with a flange to which a lid could be tightly secured. The neck was also provided with an inlet tube for the introduction of the fluorine gas. Two copper wires extended through the lid into the reactor section; their lower ends were connected by a platinum wire spiral. One copper wire was insulated and the other one contacted the brass lid.

Fluorine gas was introduced steadily into the closed container until it had a pressure of 300 mm. Hg at room temperature. The container was then immersed in liquid nitrogen, and the platinum was heated to about 1000° C. by passing an electrical current into the two copper wires. Heating was only necessary for starting the reaction which, being exothermic, then proceeded automatically. The platinum wire weighed 7 gm.; after 4 minutes fluorine introduction was discontinued, and the container was opened; it was found that a mixture of platinum tetrafluoride and platinum hexafluoride had been formed, and it seemed that all the platinum had reacted. The container was taken out of the nitrogen, and the platinum fluoride was thus allowed to distill into a condenser. A total of 5.2 gm. of platinum hexafluoride was obtained.

That the condensate actually was platinum hexafluoride, was ascertained by vapor density measurements which gave molecular weights of 297 and 304, respectively (theoretically 309). The vapor pressure of the solid platinum hexafluoride was found to be 96 mm. at 20° C. Its melting point was found to be 56.7° C. The color of massive platinum hexafluoride appears black, but dark red when viewed through a microscope.

Thereafter 753 mg. of platinum hexafluoride were mixed with 450 mg. of plutonium tetrafluoride at room temperature; the mixture was allowed to stand in a closed container for 24 hours. After this time the vapor phase above the mixture in the container was analyzed for its plutonium content by alpha-counting; from the result it was determined that 67 mg. of plutonium hexafluoride had been formed.

The same process, without modification, is applicable to the separation of plutonium from a mixture containing the plutonium as plutonium tetrafluoride and fission products as the fluorides. The plutonium tetrafluoride is converted thereby to the volatile hexafluoride and separated by distillation from the fission product fluorides which are not volatile at room temperature.

It will be understood that the process of this invention is susceptible to various modifications and changes and is not to be limited by the details given therein but merely by the scope of the appended claims.

What is claimed is:

1. A process of separating plutonium values from mixtures containing said values, comprising reacting platinum with fluorine gas at from 900 to 1100° C. whereby platinum hexafluoride is formed, contacting the platinum hexafluoride with the plutonium-containing mixture at room temperature whereby plutonium hexafluoride forms, and isolating the plutonium hexafluoride by distillation from said mixture.

2. The process of claim 1 wherein the temperature for the formation of platinum hexafluoride is about 1000° C.

3. A process of separating plutonium values from a mixture of fission product fluorides and plutonium tetrafluoride, comprising reacting platinum with fluorine gas at from 900 to 1100° C. whereby platinum hexafluoride it formed, adding the platinum hexafluoride to said mixture at room temperature whereby the plutonium tetrafluoride is converted to plutonium hexafluoride, and isolating the plutonium hexafluoride by distillation away from said fission product fluorides.

4. A process of making platinum hexafluoride, comprising reacting platinum metal with fluorine at a temperature of from 900 to 1100° C. and condensing the platium hexafluoride on a cold surface as it is formed to avoid decomposition.

5. The process of claim 4 wherein the reaction temperature is about 1000° C. and the cold surface has a temperature of about −196° C.

6. The compound platinum hexafluoride.

No references cited.